Feb. 3, 1931.  C. G. TREFETHEN  1,791,392
FLUID PRESSURE OPERATED WORK SUPPORT
Filed Dec. 31, 1928
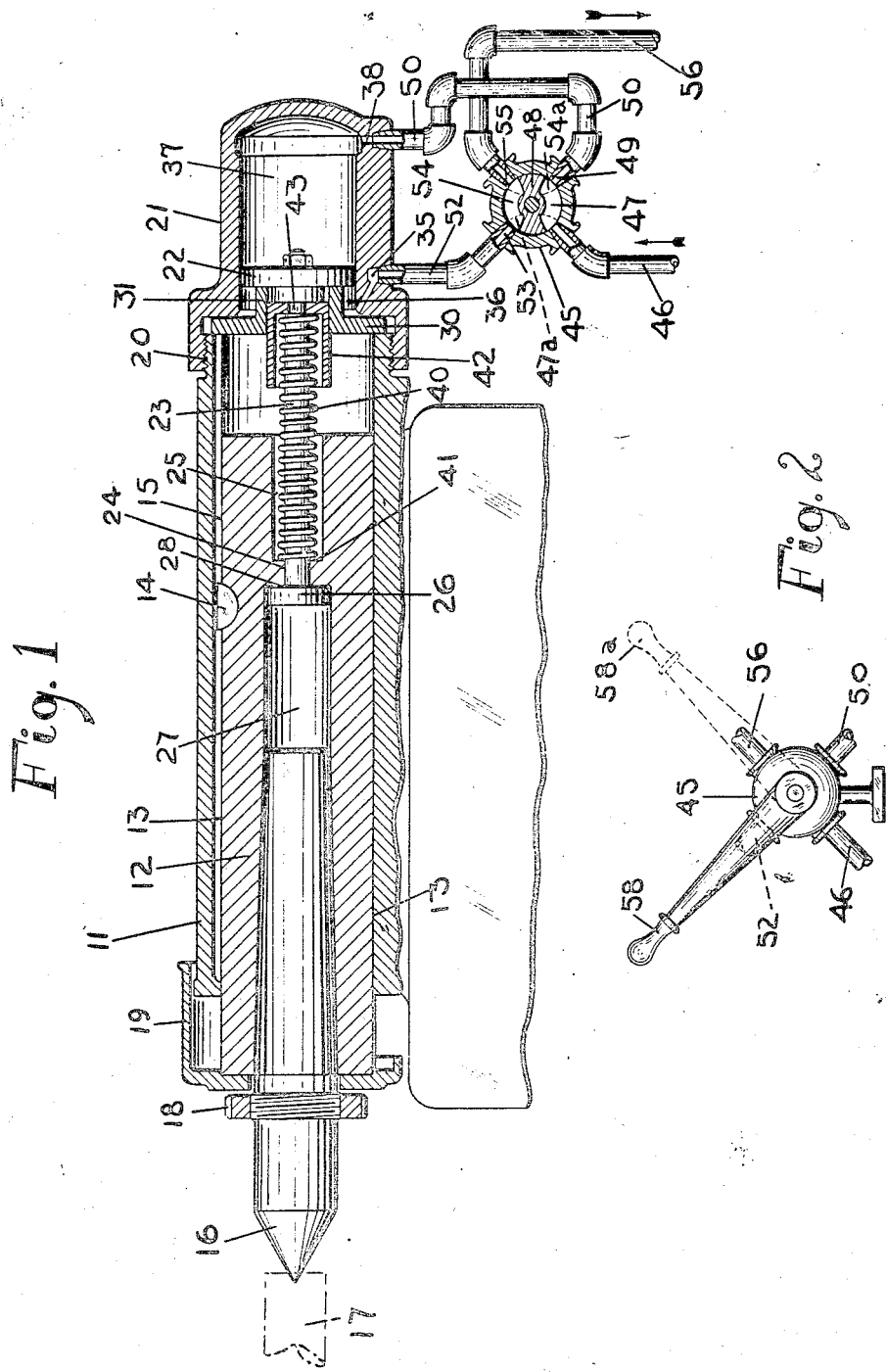
Witnesses
Edward H. Goodrich
Harold W. Eaton
Inventor
Charles G. Trefethen
By Clayton L. Jenks
Attorney Patented Feb. 3, 1931

1,791,392

UNITED STATES PATENT OFFICE

CHARLES G. TREFETHEN, OF WORCESTER, MASSACHUSETTS, ASSIGNOR TO NORTON COMPANY, OF WORCESTER, MASSACHUSETTS, A CORPORATION OF MASSACHUSETTS

FLUID-PRESSURE-OPERATED WORK SUPPORT

Application filed December 31, 1928. Serial No. 329,346.

This invention relates to a work support for machine tools, such as grinding machines, and more particularly to a footstock or headstock operating mechanism which is controlled by fluid under pressure.

It is desirable in the modern cylindrical grinding machine to provide a footstock operating mechanism by which the work supporting spindle may be readily controlled to move the spindle rapidly into contact with the work before grinding and to remove it therefrom after grinding. It is essential that the mechanism move rapidly to position the work on the machine so as to reduce the idle or non-productive period to a minimum. Heretofore, various mechanisms have been devised for effecting movement of the footstock center, such as the old and well-known hand operated mechanism which requires a double manual operation on the part of the operator to bring the center into proper contact with the work and then to lock the footstock spindle after it had been positioned. Fluid pressure devices have been utilized for operating footstock spindles but in these previous constructions, the fluid under pressure has been applied directly to the footstock spindle so that the pressure of the footstock center against the work varied with the pressure in the pipe line. This type of operating mechanism has not been satisfactory, particularly in grinding long slender pieces of work with a wide-faced wheel, since the pressure of the footstock spindle is sufficient to spring the work from its normal position and thereby cause difficulty in producing a cylindrical piece of work within the required limit. It is important that the pressure remain uniform.

It is an object of this invention to overcome this difficulty and to provide a suitable fluid pressure operated mechanism to move a work supporting spindle to and from its operating position with a minimum amount of effort on the part of the operator.

It is another object of this invention to provide a fluid pressure mechanism to cause the spindle to be properly positioned relative to the work but so arranged that the fluid pressure does not directly force the footstock spindle into contact with the work.

It is a further object of this invention to provide a fluid pressure positioning mechanism to move the spindle to and from a fixed operating position together with a resilient device interposed between the fluid pressure mechanism and the footstock spindle to give the desired pressure upon the end of the work.

Further objects will be readily apparent from the following disclosure. Referring to the drawing illustrating one embodiment of the invention as applied to a footstock, and in which like numerals indicate like parts:

Fig. 1 is a longitudinal sectional view through a footstock spindle showing the operating mechanism and also the valve to control the admission of fluid under pressure; and Fig. 2 is a fragmentary elevation of the valve showing the control lever.

The invention illustrated comprises a footstock spindle slidably mounted within the footstock frame and a fluid pressure operated mechanism to move the spindle in either direction according to the manipulation of a valve, together with a yieldable connection between the movable part of the pressure mechanism and the footstock spindle. The fluid operated mechanism is arranged to move the spindle to a fixed position for the grinding operation and to remove it to an inoperative position after the grinding operation, but the fluid pressure is not transmitted directly to the footstock center. The spindle center is held against the work by a definite spring pressure when the movable part of the fluid pressure mechanism has been moved forward to a stop.

As illustrated in the drawings, this mechanism may comprise a hollow open-ended supporting member 11 serving as a base or frame and having a spindle 12 slidably mounted in the aperture 13. The spindle may be held against rotation by a key 14 on the spindle which slides within the keyway 15 in the aperture 13. A footstock center 16, which is adapted to engage the end of a piece of work 17, is fitted in the end of the hollow spindle, and the nut 18 threaded to the center serves for withdrawing the center from the spindle, as is common in the art. The shield 19 serves to cover the end of the hollow frame and prevent dirt from getting into the slideway carrying the spindle.

The opposite end of the footstock frame is provided with a reduced screw-threaded portion 20 to which is threaded the fluid pressure cylinder 21 having a piston 22 slidably mounted therein. The piston 22 is rigidly mounted on the end of a connecting rod 23 which extends within the central aperture 24 of the spindle 12. The other end of the connecting rod 23 is formed with an enlarged head 26 which is slidably mounted in the aperture 27 in the spindle which carries the center 16 and engages a shoulder 28 at the rear end of the aperture 27. A disk shaped member 30 is interposed between the end of the threaded portion 20 of the footstock frame 11 and the inner end of the cylinder member 21 so as to form a head for the cylinder. The member 30 is provided with a projecting hub 31 which serves as a stop to limit the movement of the piston 22 when it is moved towards the left as viewed in Fig. 1.

Fluid under pressure may be obtained from any suitable source of supply, such as a compressed air pipe line or from a fluid pump or a compressor in the base of the machine. Fluid under pressure is admitted through a port 35 into the cylinder chamber 36 to cause the piston 22 to move toward the right and thereby withdraw the footstock spindle 12 and center 16 from engagement with the work 17. During this movement fluid in the cylinder chamber 37 is exhausted through port 38. If the supply of fluid under pressure is reversed and fluid is admitted through port 38 the piston 22 is moved toward the left until it strikes the stop 31, as illustrated in the drawing, thereby moving the footstock center 16 into operative engagement with the work piece.

In order that the footstock center 16 may be held yieldably in contact with the work at predetermined pressure, a helical spring 40 is mounted on the piston or connecting rod 23 and interposed between a shoulder 41 within the aperture 25 in spindle 12 and the inner end of a cup shaped member 42 clamped between a reduced end 43 of the connecting rod and the piston 22. The hub 31 of the stationary wall 30 has an aperture within which the cup shaped member 42 slides as it is moved with the piston; hence the outer wall of the member 42 serves as a seal to prevent fluid from escaping into the forward end of the casing as the piston moves.

It will be readily seen from this description, that when the piston 22 moves toward the left, its movement continues until the piston strikes the hub 31 thereby preventing further movement of the piston toward the work. The spring 40 is compressed by this movement and placed under sufficient tension to hold the center on the spindle pressed outwardly against the work and hold it with a desired pressure during the grinding operation. If it is desired to increase or decrease the spring pressure of the center upon the work, this may be accomplished by moving the footstock frame 11 along the table (not shown) in a direction toward or from the work, the tension of the spring depending upon the location of the center 16 when it is brought into contact with the work.

Any suitable valve mechanism may be utilized to control the flow of the fluid under pressure, such as for example, the valve 45, as shown in Fig. 1. Fluid under pressure is forced through the inlet pipe 46 into the chamber 47 in the rotary valve member 48 passing through the valve port 49 and pipe 50 and through the port 38 into the cylinder chamber 37, thereby forcing the piston 22 toward the left and moving the footstock center to an operative position. The piston moves towards the left until it contacts with the hub 31. During this movement of the piston, fluid is exhausted from the cylinder chamber 36 through the port 35, the pipe 52, the valve port 53, the valve chamber 54, and the valve port 55 and then exhausted through the pipe 56. The rotary valve member 48 may be controlled by a manually operable lever 58 which is shown in Fig. 2. Similarly, when the lever 58 is moved to position 58a (as shown in dotted lines in Fig. 2) and the rotary valve member 48 moved to the position indicated in dotted lines in Fig. 1, the fluid under pressure will be reversed so that the direction of flow will be in the opposite direction and fluid passing through the inlet pipe 46 will pass through the valve chamber 47a and out through the port 53, the pipe 52, the port 35 and into the cylinder chamber 36, thereby moving the piston 22 toward the right and withdrawing the spindle 12 and center 16 from contact with the work 17 to an inoperative position.

The operation of this mechanism will be readily apparent from the foregoing disclosure. When the operator has inserted the piece of work in position in alignment with the center 16 he swings the lever 58 into the position shown in full lines in Fig. 2, thereby moving the rotary valve member 48 into the position as shown in full lines in Fig. 1. This permits fluid under pressure to pass from the inlet pipe 46 through the valve chamber 47 and into the cylinder chamber 37 thereby moving the piston 22 into the position as shown in Fig. 1 in contact with the hub 31. This movement places the spring 40 under sufficient tension to move the spindle center into proper contact with the work for the grinding operation. When the work has been ground to the required size and the operator desires to remove the piece of work from the machine, he shifts the lever from position 58 into the position 58a as shown in dotted lines in Fig. 2. This movement swings the rotary valve member 48 into the position as indicated by the dotted lines in Fig. 1. When the valve member is in this position fluid passing through the inlet pipe 46 and the valve chamber 47a enters through the port 35 into the cylinder chamber 36 exerts a pressure and thereby moves the piston 22, the connecting rod 23 and the cup shaped member 42 to the right, thus engaging the head 26 with the shoulder 28 to positively withdraw the center 16 from operative engagement with the work. Since the rearward travel of the piston does not compress the spring 40, the fluid pressure may now be shut off and the center will remain disengaged from the work until fluid pressure is again applied to the piston through port 38. When the piston travels toward the work, only the spring pressing against the shoulder 41 serves to move the spindle and the center 16 toward the work since the connecting rod slides freely through the spindle.

It will be apparent that the invention as described may be employed in various types of machine tools, such as lathes as well as grinding machines, in which the work is mounted to rotate about a center. It applies to a headstock support for the work as well as to a footstock and it is usable in a double head machine or in one in which the work pieces are automatically gripped by one or two work supports in timed relation with the wheel movement towards and from the work.

Having thus described the invention, what is claimed as new and is desired to secure by Letters Patent is:

1. A support for centering rotatable work comprising a hollow casing having a fluid pressure chamber in the rear end thereof and a centering device slidably mounted in the forward end of the casing, a piston reciprocable within said chamber, a valve and connections to admit fluid to either end of said chamber, and resilient means between said piston and centering device to transmit pressure from said piston to the centering device and cause the latter to yieldingly engage the work.

2. A support for centering rotatable work comprising a hollow casing, a centering device slidably mounted within one end thereof, a piston and cylinder mechanism at the other end of the casing, a valve to admit fluid to either end of said cylinder, resilient connections between said piston and centering device whereby the latter may be yieldingly presented to the work, and a stop to limit the movement of the piston toward the work so that the centering device engages the work only by the pressure of said resilient connections.

3. A work support comprising a hollow casing having a fluid pressure chamber within the rear end thereof, a centering device slidably mounted in the forward end of the casing, a piston reciprocable within said chamber, a valve and connections to admit fluid under pressure to either end of said chamber, resilient means movable by said piston to yieldingly present the centering device to the work, and a connecting rod fastened to and positively moved by the piston to retract the centering device from the work.

4. A work support for grinding machines comprising a hollow member, a centering device slidably mounted at one end thereof, a piston and cylinder mechanism at the other end of said member, a valve to admit fluid to either end of said cylinder, a resilient connection between the piston and the centering device to yieldingly present the latter to the work, a stop to limit the forward motion of the piston whereby the centering device engages the work solely by the pressure of said resilient connections, and means moved by the piston for positively retracting the centering device from the work.

5. A work support for grinding machines comprising a hollow casing, a centering device slidably mounted at one end thereof, a piston and cylinder mechanism at the other end of the casing, a valve to admit fluid to either end of said cylinder, a connecting rod secured to and moved by the piston which is freely slidable in a forward direction relative to the centering device, cooperating parts on the rod and centering device whereby the latter is positively withdrawn by the rearward movement of the piston, and resilient means between the piston and the centering device for yieldingly moving the latter toward the work piece.

Signed at Worcester, Massachusetts, this 28th day of December, 1928.

CHARLES G. TREFETHEN.